US010836026B2

(12) United States Patent
Moufawad

(10) Patent No.: US 10,836,026 B2
(45) Date of Patent: Nov. 17, 2020

(54) MULTI WRENCH

(71) Applicant: Samir Moufawad Moufawad, Mazraat Yashouh (LB)

(72) Inventor: Samir Moufawad Moufawad, Mazraat Yashouh (LB)

( * ) Notice: Subject to any disclaimer, the term of this patent is extended or adjusted under 35 U.S.C. 154(b) by 131 days.

(21) Appl. No.: 16/266,128

(22) Filed: Feb. 4, 2019

(65) Prior Publication Data

US 2020/0246956 A1 Aug. 6, 2020

(51) Int. Cl.

*B25F 1/04* (2006.01)
*B25B 23/00* (2006.01)
*B25B 13/56* (2006.01)
*B23B 13/02* (2006.01)
*B25B 13/02* (2006.01)

(52) U.S. Cl.

CPC ................ *B25F 1/04* (2013.01); *B25B 13/02* (2013.01); *B25B 13/56* (2013.01); *B25B 23/0035* (2013.01)

(58) Field of Classification Search

CPC . B25F 1/04; B25B 13/02; B25B 13/56; B25B 23/0035; B25B 13/00; B25B 13/102; B25B 13/04; B25B 13/005; B25B 13/06; B25B 13/065; B25B 23/00; B25B 23/0007

USPC ................ 81/176.1, 52, 124.5, 124.4, 177.6; D8/105, 21, 27

See application file for complete search history.

(56) References Cited

U.S. PATENT DOCUMENTS 992,873 A * 5/1911 Higgins .................. B25B 13/08 81/125.1
2,097,361 A * 10/1937 Bagley .................... B25B 13/04 81/177.6
4,505,171 A * 3/1985 Chang ..................... B25B 13/06 81/124.5
4,611,514 A * 9/1986 Hyde .................... B25B 13/461 81/60
6,286,168 B1 * 9/2001 Woodruff ................ B25B 13/56 7/138
7,168,345 B1 * 1/2007 Hsieh .................... B25B 13/461 411/403
7,182,000 B1 * 2/2007 Dicksen ................ B25B 13/481 81/177.2
7,343,836 B1 * 3/2008 Ward ...................... B25B 13/04 81/177.6
10,321,752 B2 * 6/2019 Zentil ..................... G06F 1/163
2004/0144217 A1 * 7/2004 Hu .......................... B25B 13/04 81/177.8
2004/0200324 A1 * 10/2004 Taggart, Sr. ............ B25B 13/56 81/177.1
2007/0169589 A1 * 7/2007 Hsieh .................. B25B 23/0035 81/177.1
2010/0288081 A1 * 11/2010 Nguyen ................ B25B 13/481 81/57.29

* cited by examiner

*Primary Examiner* — Justin M Jonaitis

(57) ABSTRACT

A multi wrench with tool heads rotationally coupled to the outer circumference of at least one end of a handle. The tool heads are comprised of spanners, sockets, ratchet sockets and nested spanners and sockets. The tool heads are operational in all positions for best comfortable use, with some positions giving best clear vision of operation. Another variation of the invention is a frame with tool heads rotationally coupled to its outer circumference. One side has a stud or a hole which engages a hole or a stud of a conventional handle. While the other side has a stud or a hole which engages a hole or a stud of a conventional tool.

14 Claims, 3 Drawing Sheets

MULTI WRENCH

BACKGROUND OF THE INVENTION

Field of the Invention

Embodiments of the invention described herein pertain to the field of wrenches. More particularly, but not by way of limitation, one or more embodiments of the invention enable a multi wrench with spanners, sockets, ratchet sockets and nested spanners and sockets.

Description of the Related Art

Multi wrenches allow turning of nuts or bolts without having to carry many individual tool heads. Though prior inventions have incorporated multiple tool heads and have commercial success, there has been a continuing need for improvement. Such improvement consists of optimizing the combination of the functions and properties of such multi wrenches. These functions and properties include: minimization of weight, ease of use, ease of changing or engaging individual tool head, not losing the individual tool head, and having clear vision of the operating tool heads.

The present invention overcomes all the problems mentioned above and adds the advantage of being able to pack a lot of tool heads.

BRIEF SUMMARY OF THE INVENTION

Tool heads share a common handle and are rotationally coupled to the outer circumference of at least one end of the handle. Individual tool heads are easily engaged by being manually rotated to the desired position. They are rotationally coupled to the jaws of the multi wrench so they will not get lost. Furthermore, there are many operational positions for best comfortable use, with some positions giving best clear vision of operation. The multi wrench weighs less because of the use of one common handle, and because tools include only the tool heads.

Another variation of the present invention is the use of a frame. Tool heads are rotationally coupled to the outer circumference of the frame. The frame has a hole or stud to engage the stud or hole of a conventional handle.

Not only the present invention overcomes all disadvantages other inventions have, but adds the advantage of being able to pack a lot of tool heads: Having nested tool heads at the outer circumference of the frame or end of handle; increasing the size of the outer circumference of the frame or end of handle; and having another hole or stud in the middle of frame or end of handle to engage more conventional tools.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION

Figure 1:
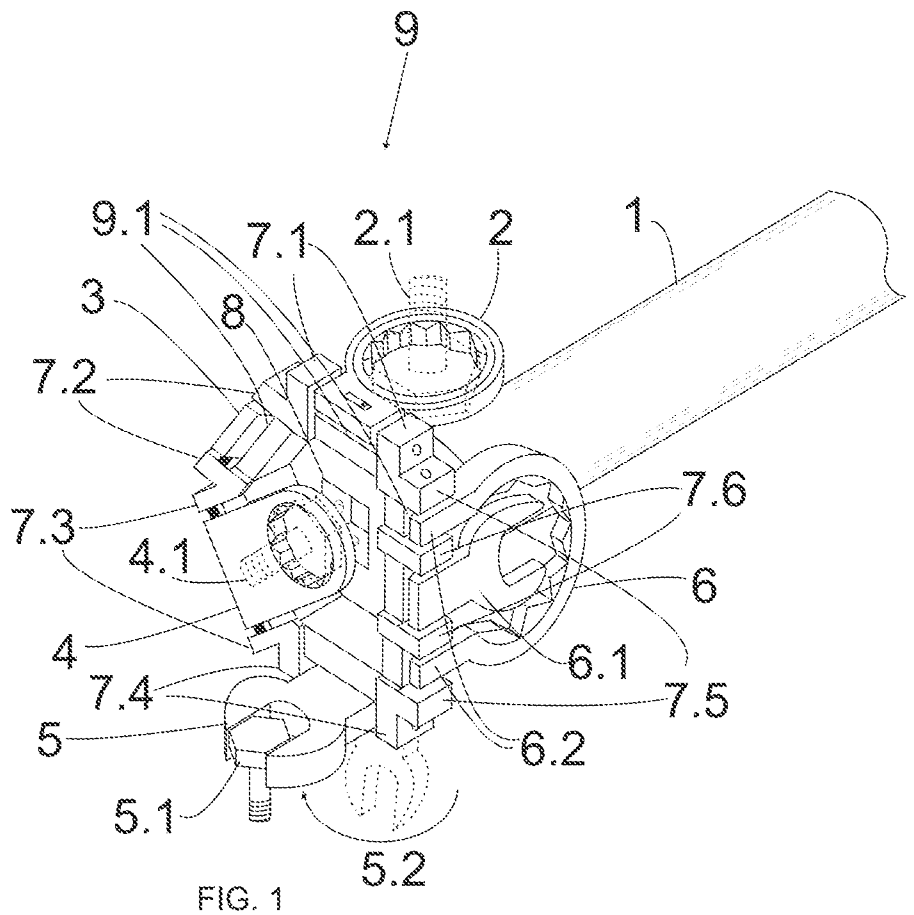
FIG. 1 illustrates exemplary tools rotationally coupled to the outer circumference of one end of a handle in accordance with the multi wrench described herein.

The multi wrench will now be described using exemplary embodiments of the invention. It will be apparent to an ordinary skilled in the art person that the present invention may be practiced without incorporating all its aspects herein. Readers should note that although examples of the invention are set forth herein, the claims, and the full scope of any equivalents, are what define the metes and bounds of the inventions FIG. 1 illustrates exemplary tools rotationally coupled to the outer circumference of one end of a handle in accordance with the multi wrench described herein.

At least 4 jaws are coupled to the outer circumference of end 9 of handle 1. Ratchet socket 2 is in inward axial position toward handle 1, or home position. Ratchet socket 2 is rotationally coupled to jaws 7.1 and can operate bolt 2.1, but with limited view since the view is blocked by handle 1.

Tool head 3 is rotationally coupled to jaws 7.2 and is in home position. It also can operate on a bolt or nut but with limited view since it is blocked by handle 1.

Socket 4 is rotationally coupled to jaws 7.3 and is in inward radial position. In this position, socket 4 can operate on a bolt 4.1, but with limited view, since the view is blocked by end 9 and handle 1.

Spanner 5 is rotationally coupled to jaws 7.4. Spanner 5 is being manually rotated in direction 5.2 from home position to outward axial position of handle 1. This position is an operational position. Spanner 5 has a clear view of operation on bolt 5.1.

Nested tool heads 6 and 6.1 have the inner tool head being a spanner 6.1 and outer tool head being a socket 6. Spanner 6.1 is rotationally coupled to jaws 7.6, and socket 6 is rotationally coupled to jaws 7.5 and jaws 7.6 at its open ring 6.2. Jaws 7.6 are added to give strength to nested tool heads 6 and 6.1.

Hole 8 is positioned on front of end 9 of handle 1 and in between all jaws, and can further engage a stud of a conventional tool.

Although tool heads can be replaceable, it is more advantageous that they are non-removable which means that they are easily engaged and disengaged and will not get lost.

Nested tool heads are not nested within the tool's handles, they are nested within the tool heads themselves thus saving on the weight and size of the multi wrench.

Figure 2:
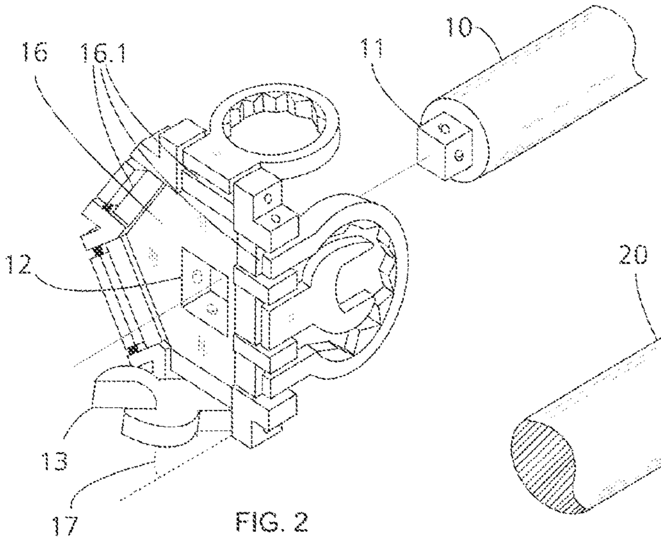
FIG. 2 illustrates exemplary tools rotationally coupled to the outer circumference of a frame with a hole in accordance with the multi wrench described herein.

FIG. 2 illustrates exemplary tools rotationally coupled to the outer circumference of a frame with a hole in accordance with the multi wrench described herein.

Many tools are rotationally coupled to many jaws which are coupled to the outer circumference of frame 16.

Spanner 13 is in outward position from handle 10 but with some angle 16 which facilitate its use in comfortable operation position, and at the time still provide clear vision.

Frame 16 has in between all the jaws a hole 12 which accommodates a stud 11 of a conventional handle 10.

Figure 3:
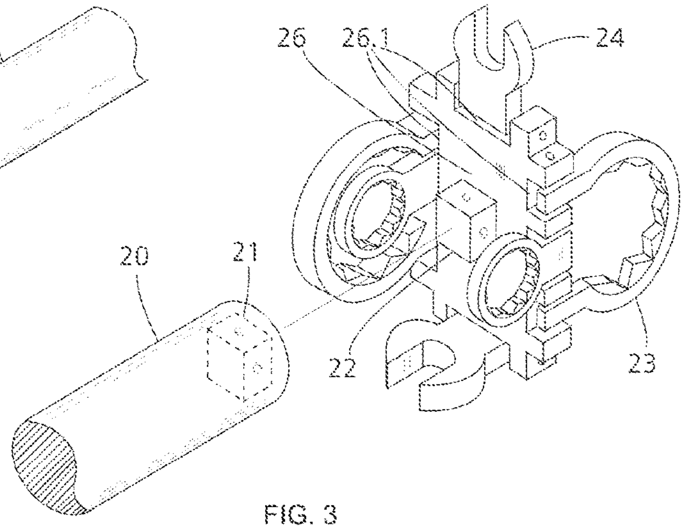
FIG. 3 illustrates exemplary tools rotationally coupled to the outer circumference of a frame with a stud in accordance with the multi wrench described herein.

FIG. 3 illustrates exemplary tools rotationally coupled to the outer circumference of a frame with a stud in accordance with the multi wrench described herein.

Many tools are rotationally coupled to many jaws which are coupled to the outer circumference of frame 26.

Socket 23 is an outer socket and is in position to operate with a clear vision.

Spanner 24 in a radial outward position and can operate on a bolt or a nut with a clear vision.

Stud 22 engages hole 21 of a conventional handle 20.

Figure 4:
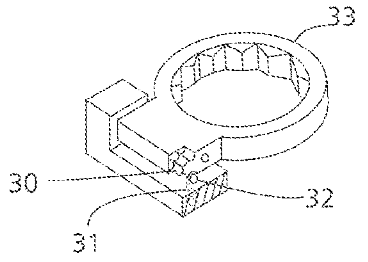
FIG. 4 is a diagram of an exemplary locking mechanism for a socket using ball and spring in accordance with the multi wrench described herein.

FIG. 4 is a diagram of an exemplary locking mechanism for a tool head using ball and spring in accordance with the multi wrench described herein.

Teeth 30 on the hinged part of socket 33, ball 32 and spring 31 form a locking mechanism on many positions of socket 33.

Figure 5:
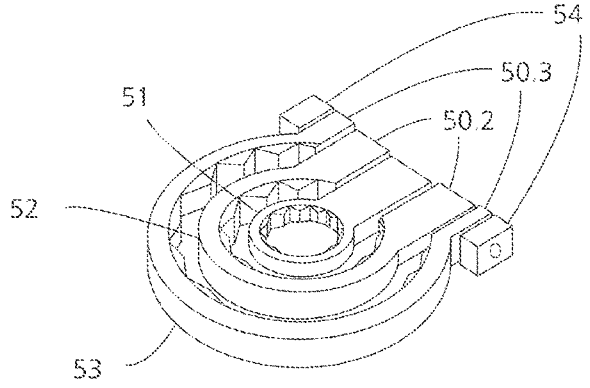
FIG. 5 is a diagram of an exemplary three nested tool heads in accordance with the multi wrench described herein.

FIG. 5 is a diagram for an exemplary three nested tool heads in accordance with the multi wrench with a frame described herein.

In this example, three nested sockets are shown. The most inner 51 is rotationally coupled to jaws 54. While middle socket 52 and outer socket 53 are rotationally coupled to jaws 54 at their open rings 50.2 and 50.3 respectively.

Figure 6:
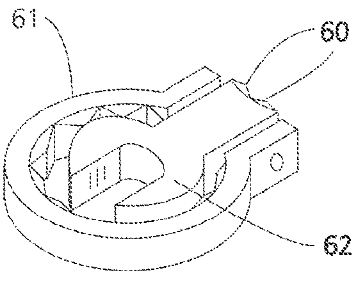
FIG. 6 is a diagram of an exemplary two nested tool heads with teeth on the hinged part of the most inner tool head in accordance with the multi wrench with a frame described herein.

FIG. 6 is a diagram for an exemplary two nested tool heads with teeth on the hinged part of the inner tool head in accordance with the multi wrench with a frame described herein.

Figure 7:
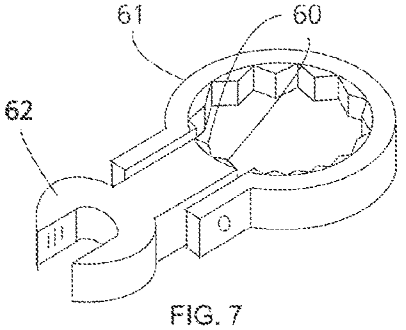
FIG. 7 is a diagram of the two nested tool heads of FIG. 6 deployed for operation in accordance with the multi wrench described herein.

Teeth 60 in the hinged part of spanner 62, give more strength to socket 61 when the later is in operation position as shown in FIG. 7.

Figure 8:
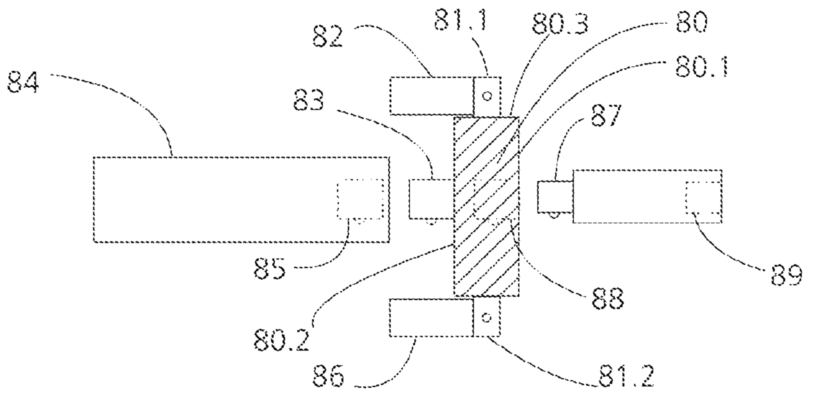
FIG. 8 is a diagram of a side view of an exemplary frame with a stud on one side and a hole on the other side in accordance with the multi wrench described herein.

FIG. 8 is a diagram of a side view of an exemplary frame with a stud on one side and a hole on the other side in accordance with the multi wrench described herein.

Tools 82 and 86 are rotationally coupled respectively to jaws 81.1 and 81.2 which are coupled to frame 80.

Stud 83 is coupled to side 80.2 in between all jaws. Stud 83 engages hole 85 of a conventional handle 84. While hole 88 is positioned between all jaws on the other side 80.1. Hole 86 engages stud 87 of a conventional tool 89.

Figure 9:
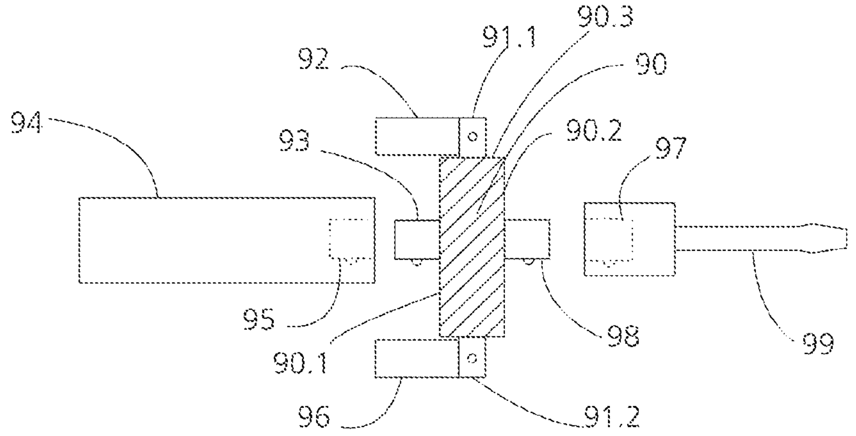
FIG. 9 is a diagram of a side view of an exemplary frame with a stud on one side and a stud on the other side in accordance with the multi wrench described herein.

FIG. 9 is a diagram of a side view of an exemplary frame with a stud on one side and a stud on the other side in accordance with the multi wrench described herein.

Tools 92 and 96 are rotationally coupled respectively to jaws 91.1 and 91.2 which are coupled to frame 90.

Stud 93 is coupled to side 90.1 in between all jaws. Stud 93 engages hole 95 of a conventional handle 94. While stud 98 is coupled to the other side 90.2 in between all jaws. Stud 98 engages hole 97 of a conventional tool 99.

Stud 93 is coupled to first side 90.2, and engages hole 95 of a conventional handle 94. While stud 96 is coupled to side 90.2, and engages hole 97 of a conventional tool 99.

Figure 10:
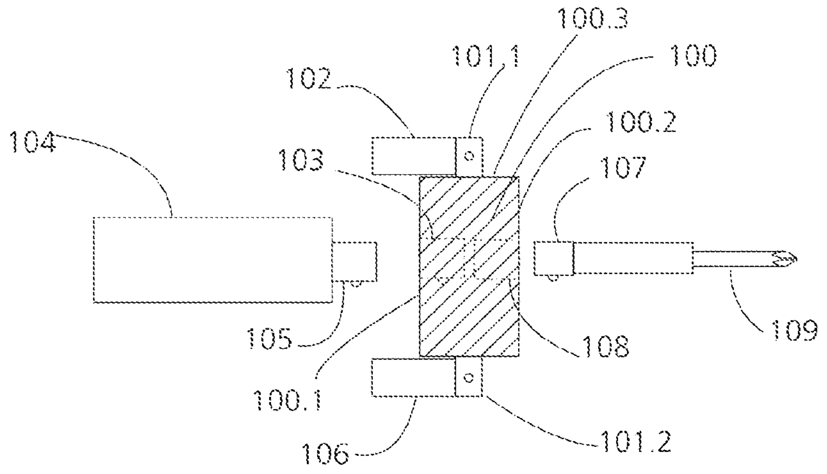
FIG. 10 is a diagram of a side view of an exemplary frame with a hole on one side and a hole on the other side in accordance with the multi wrench described herein.

FIG. 10 is a diagram of a side view of an exemplary frame with a hole on one side and a hole on the other side in accordance with the multi wrench described herein.

Tools 102 and 106 are rotationally coupled respectively to jaws 101.1 and 101.2 which are coupled to frame 100.

Hole 103 is positioned inside side 100.1 in between all jaws. Hole 103 engages stud 105 of a conventional handle 104. While hole 108 is positioned on the other side 100.2 in between all jaws. Hole 108 engages stud 107 of a conventional tool 109.

The multi wrench has a minimum weight by using only the tool heads with a common handle, unlike U.S. Pat. No. 4,505,171. Tool heads are easily engaged and disengaged by a simple rotation by hand, unlike with U.S. Pat. No. 992,873 where tool heads need to be unlocked to rotate, or with U.S. Pat. No. 7,343,836 where a pin has to be removed to be able to replace a tool head. Tool heads will not get lost as in U.S. Pat. No. 7,343,836. Every individual tool heads have an excellent view, unlike U.S. Pat. Nos. 992,873 and 1,571,148. Nested tool heads can add a lot more tool heads, unlike U.S. Pat. No. 2,097,361 which have nested handles and not nested tool hands. Tool heads have high accessibly to fasteners unlike U.S. Pat. No. 992,873 where middle tool heads cannot access well the fasteners. In conclusion, the present invention optimizes the combination of the functions and usage of a multi wrench with minimum weight and ease of use. Tool heads are easily engaged and disengaged, easily and highly individually accessed, operating with clear vision and tool heads will not get lost.

What is claimed is:

1. A multi wrench including:

a frame with a bottom side and a top side and an outer circumference separating the first side from the second side comprising at least a first side, a second side, and a third side;

a first hole or a first stud coupled to a center of said bottom side, wherein said first hole or said first stud engages a handle;

at least three jaws coupled to said outer circumference comprising a first jaw coupled to the first side, a second jaw coupled to the second side, and a third jaw coupled to the third side;

wherein said first jaw includes a nested set of tool heads, said nested set of tool heads comprising at least one inner tool head comprising a spanner or a socket or a ratchet socket and an outer tool head which is a socket with an open ring, said outer tool head including an opening to accommodate the inner tool head in a nested form;

wherein the second and third tool heads are selected from the group consisting of, a spanner, a socket, a ratchet, or a nested set of tool heads; and wherein said tool heads are rotationally coupled to said jaws to allow the tool heads to be rotated between a storing position and a usable position.

2. A multi wrench including:

a frame with a bottom side and a top side and an outer circumference separating the first side from the second side comprising at least a first side, a second side, and a third side;

a hole or a stud coupled to a center of said bottom side;

a handle including a hole that engages the stud of said frame or a stud that engages a hole of said frame, said handle being selectively attachable and detachable;

at least three jaws coupled to said outer circumference comprising a first jaw coupled to the first side, a second jaw coupled to the second side, and a third jaw coupled to the third side;

wherein said first jaw includes a nested set of tool heads, said nested set of tool heads comprising at least one inner tool head comprising a spanner or a socket or a ratchet socket and an outer tool head is a socket with an open ring, said outer tool head including an opening to accommodate the inner tool head in a nested form;

wherein the second and third tool heads are selected from the group consisting of, a spanner, a socket, a ratchet, or a nested set of tool heads; and wherein said tool heads are rotationally coupled to said jaws to allow the tool heads to be rotated between a storing position and a usable position.

3. A multi wrench including:

a frame with a bottom side and a top side and an outer circumference separating the first side from the second side comprising at least a first side, a second side, and a third side;

a handle formed integral with a central portion of said frame;

at least three jaws coupled to said outer circumference comprising a first jaw coupled to the first side, a second jaw coupled to the second side and a third jaw coupled to the third side;

wherein said first jaw includes a nested set of tool heads, said nested set of tool heads comprising at least one inner tool head comprising a spanner or a socket or a ratchet socket and an outer tool head is a socket with an open ring, said outer tool head including an opening to accommodate the inner tool head in a nested form;

wherein the second and third tool heads are selected from the group consisting of, a spanner, a socket, a ratchet, or a nested set of tool heads; and wherein said tool heads are rotationally coupled to said jaws to allow the tool heads to be rotated between a storing position and a usable position.

4. The multi wrench of claim 1 wherein at least one of said tool heads comprises a locking mechanism.

5. The multi wrench of claim 1 wherein the first hole or the first stud comprises a locking mechanism.

6. The multi wrench of claim 1 further comprising a second hole or a second stud coupled to said top side for engaging a stud or a hole of a conventional fastener.

7. The multi wrench of claim 6 wherein the second hole or the second stud comprises a locking mechanism.

8. The multi wrench of claim 2 wherein at least one of said tool heads comprises a locking mechanism.

9. The multi wrench of claim 2 wherein the hole or the stud comprises a locking mechanism.

10. The multi wrench of claim 2 further comprising a second hole or a second stud coupled to said top side for engaging a stud or a hole of a conventional fastener.

11. The multi wrench of claim 10 wherein the second hole or the second stud comprises a locking mechanism.

12. The multi wrench of claim 3 wherein at least one of said tool heads comprises a locking mechanism.

13. The multi wrench of claim 3 further comprising a hole or a stud coupled to said top side for engaging a stud or a hole of a conventional fastener.

14. The multi wrench of claim 13 wherein the hole or the stud comprises a locking mechanism.

* * * * *